US010892837B2

(12) United States Patent
Kits van Heyningen et al.

(10) Patent No.: US 10,892,837 B2
(45) Date of Patent: Jan. 12, 2021

(54) METHODS AND APPARATUS FOR TRANSPORTING DATA ON A NETWORK (71) Applicant: KVH Industries, Inc., Middletown, RI (US)

(72) Inventors: Martin A. Kits van Heyningen, Newport, RI (US); John Croy, Middletown, RI (US); Daniel Murray Benson, Newport, RI (US)

(73) Assignee: KVH Industries, Inc., Middletown, RI (US)

( * ) Notice: Subject to any disclaimer, the term of this patent is extended or adjusted under 35 U.S.C. 154(b) by 0 days.

(21) Appl. No.: 16/672,337

(22) Filed: Nov. 1, 2019

(65) Prior Publication Data
US 2020/0067618 A1 Feb. 27, 2020

Related U.S. Application Data (63) Continuation of application No. 15/569,839, filed as application No. PCT/US2016/024681 on Mar. 29, 2016, now Pat. No. 10,516,496.
(Continued)

(51) Int. Cl.
G06F 15/173 (2006.01)
H04H 20/77 (2008.01)
H04H 20/81 (2008.01)
H04L 29/06 (2006.01)
H04B 7/185 (2006.01)
H04H 60/82 (2008.01)
H04W 28/02 (2009.01)
H04H 20/38 (2008.01)
H04L 12/26 (2006.01)
H04L 12/24 (2006.01)
H04H 20/42 (2008.01)
(Continued)

(52) U.S. Cl.
CPC .............. *H04H 20/77* (2013.01); *H04B 7/185* (2013.01); *H04H 20/38* (2013.01); *H04H 20/42* (2013.01); *H04H 20/81* (2013.01); *H04H 60/82* (2013.01); *H04L 29/06* (2013.01); *H04L 41/046* (2013.01); *H04L 41/0896* (2013.01); *H04L 43/0894* (2013.01); *H04L 47/2433* (2013.01); *H04L 69/14* (2013.01); *H04W 28/0263* (2013.01); *H04H 60/81* (2013.01)

(58) Field of Classification Search
USPC .......................... 709/223, 227, 228, 229, 217
See application file for complete search history.

(56) References Cited

U.S. PATENT DOCUMENTS 5,021,949 A 6/1991 Morten et al.
5,586,121 A 12/1996 Moura et al.
(Continued)

OTHER PUBLICATIONS

International Search Report and Written Opinion dated Jun. 16, 2016 in connection with International Application No. PCT/US2016/024861.
(Continued)

Primary Examiner — Lai Dai T Truong
(74) Attorney, Agent, or Firm — Wolf, Greenfield & Sacks, P.C.

(57) ABSTRACT

Techniques are provided for managing the transfer of data over a network. Multiple channels may be established for accommodating various categories of data transfers, and the amount of network bandwidth allocated to each channel may be dynamically adjusted to accommodate any of numerous performance objectives.

50 Claims, 4 Drawing Sheets

Related U.S. Application Data (60) Provisional application No. 62/198,613, filed on Jul. 29, 2015, provisional application No. 62/167,985, filed on May 29, 2015.

(51) Int. Cl.
*H04L 12/851* (2013.01)
*H04H 60/81* (2008.01)

(56) References Cited

U.S. PATENT DOCUMENTS

| | | |
|---|---|---|
| 10,516,496 B2 | 12/2019 | Kits van Heyningen et al. |
| 2001/0021197 A1 | 9/2001 | Foore et al. |
| 2003/0017845 A1 | 1/2003 | Doviak et al. |
| 2003/0099221 A1 | 5/2003 | Rhee |
| 2005/0197119 A1 | 9/2005 | Bahl et al. |
| 2011/0276699 A1 | 11/2011 | Pedersen |
| 2014/0119184 A1 | 5/2014 | Harrang et al. |
| 2015/0124605 A1 | 5/2015 | Gholmieh et al. |
| 2018/0131456 A1 | 5/2018 | Kits van Heyningen et al. |

OTHER PUBLICATIONS

International Preliminary Report on Patentability dated Jul. 3, 2017 in connection with International Application No. PCT/US2016/024681.
Extended European Search Report dated Aug. 21, 2018 in connection with European Application No. 16803885.9.
European Examination Report dated May 23, 2019 in connection with European Application No. 16803885.9.
European Communication dated Dec. 5, 2019 in connection with European Application No. 16803885.9.
European Communication for European Application No. EP 16803885.9 dated Jun. 29, 2020.
EP 16803885.9, dated Jun. 29, 2020, European Communication.
PCT/US2016/024681, dated Jun. 16, 2016, International Search Report and Written Opinion.
PCT/US2016/024681, dated Jul. 3, 2017, International Preliminary Report on Patentability.
EP 16 803 885.9, dated May 23, 2019, European Communication.
EP 16 803 885.9, dated Aug. 21, 2018, Extended European Search Report.
EP 16 803 885.9, dated Dec. 5, 2019, European Communication.

METHODS AND APPARATUS FOR TRANSPORTING DATA ON A NETWORK

RELATED APPLICATIONS

This application is a continuation of U.S. patent application Ser. No. 15/569,839, filed Oct. 27, 2017, entitled "Methods and Apparatus for Transporting Data on a Network," which is a national stage application under 35 U.S.C. § 371 of International Application Serial No. PCT/US2016/024681, filed on Mar. 29, 2016, entitled "Methods and Apparatus for Transporting Data on a Network," which claims the benefit of the filing date of U.S. Provisional Patent Application Ser. No. 62/198,613, filed on Jul. 29, 2015, entitled "Methods and Apparatus for Transporting Data on a Network," and of U.S. Provisional Patent Application Ser. No. 62/167,985, filed on May 29, 2015, entitled "Efficient File Transport on A Shared Network,". Each of the documents listed above is incorporated herein by reference in its entirety.

BACKGROUND

Communication over a network often involves a "source" host on the network transmitting information to one or more other "destination" hosts on the network. Such communications typically travel over one or more physical links, such as switches, routers, hubs, etc. Many links have limitations with respect to the amount of information they can transfer in a particular period of time. As multiple source hosts on the network may attempt to transmit information to destination hosts over a given link at any given time, communication delays may occur when the link nears or exceeds its data transfer capacity. For example, in satellite, cellular, and radio networks in which many communications flow through a relatively small number of links (e.g., a satellite that serves multiple hosts in a given geographic area, a cellular tower that serves multiple mobile devices in a given geographic area, etc.), attempts by one or more hosts to transfer large amounts of information via a given link can cause bottlenecks to build up, causing delays and potentially leading to significant downstream adverse effects.

A number of approaches have been developed to manage the transfer of data over networks to accomplish specific performance objectives. As one example, protocols designed to support "Quality of Service" (QoS) objectives on networks which carry telephone traffic may assign higher priority to data (e.g., packets) associated with telephone calls than to data associated with non-telephone traffic, to facilitate timely transfer of the telephone traffic from a source host to a destination host. While such prioritization schemes can be effective in managing network traffic in certain circumstances, they may lose their effectiveness if enough hosts attempt to send high-priority data at the same time that the underlying links' capacity limitations are exceeded. In addition, such prioritization schemes may be overly rigid in practice, as specific types of data are classified in specific ways regardless of the types and quantity of data currently being transferred across the network.

SUMMARY

In accordance with some embodiments of the invention, techniques are provided for managing the transfer of data over a network. In some embodiments, multiple channels may be established for accommodating various categories of data transfers, and the amount of network bandwidth allocated to each channel may be dynamically adjusted to accommodate any of numerous performance objectives. For example, in some embodiments, one or more "primary" channels may be established and used to transfer relatively higher-priority ("day to day") network traffic, one or more "secondary" channels may be established and used to transfer relatively lower-priority network traffic, and the network bandwidth allocated to the one or more primary and secondary channels may be dynamically adjusted to support the achievement of any of numerous performance objectives. (The terms "primary" and "secondary" are placed in quotes above because it should be understood that any suitable type(s) of traffic may be transported on any suitable channel(s). The terms "primary" and "secondary" are used herein merely to distinguish one or more channels used to carry one type of traffic as opposed to another, and not to denote any precedence.) The bandwidth which is apportioned to the primary and secondary channels may be dynamically adjusted over time, based upon considerations including the quantity and types of traffic transferred across the network during a prior period, and the quantity and types of data yet to be transferred by individual hosts on the network. By dynamically adjusting the bandwidth apportioned to different types of traffic over time, some embodiments of the invention may enable the total bandwidth available on a network to be more effectively utilized than conventional approaches allow, without jeopardizing the network's continued ability to handle data traffic.

In some embodiments of the invention, the allocation of bandwidth amongst channels may be centrally managed. For example, some embodiments may employ a management controller implemented on one or more "central" hosts. An agent implemented on one or more remote hosts on the network may communicate with the management controller, and act on information provided by the management controller in transmitting data. In some embodiments, the management controller may analyze traffic flowing over the network, determine the rate at which various hosts on the network should transfer data, and on what channel(s). The management controller may send information to agents on each host indicating how to transfer data over a particular subsequent period of time, and the agent may analyze that information in determining how to structure subsequent transmissions. Agents may report to the management controller on transmission rates over the period, and quantities of data which the hosts have yet to transfer, and the management controller may analyze this information to generate new information to send to the agents. As such, some embodiments of the invention may implement a feedback loop which allows the manner in which data is transferred across the network to be dynamically altered to capitalize on available bandwidth and achieve any of numerous performance objectives.

In some embodiments of the invention, a method is provided for use in a computing system comprising at least one network, a plurality of hosts coupled to the at least one network, and a management controller coupled to the plurality of hosts via the at least one network. Each of the plurality of hosts comprises a respective agent, and the plurality of hosts comprises a first host comprising a first agent. The method comprises acts of: (A) receiving, by the management controller, reports sent by the plurality of hosts of respective quantities of data to be transmitted over the at least one network; (B) analyzing, by the management controller, data transmissions over the at least one network during at least one prior period; (C) determining, by the management controller, based at least in part upon the reports received in the act (A) and a result of the analyzing in the act (B), a first manner in which each of the plurality of hosts is to transmit data over one or more primary channels on the at least one network, and a second manner in which each of the plurality of hosts is to transmit data over one or more secondary channels on the at least one network; and (D) sending, by the management controller to the first agent, instructions comprising an indication of the first manner in which the first host is to transmit data over the one or more primary channels on the at least one network, and the second manner in which the first host is to transmit data over the one or more secondary channels on the at least one network.

Other embodiments of the invention are directed to at least one computer-readable storage medium having instructions recorded thereon which, when executed in a computing system comprising a management controller, at least one network, and a plurality of hosts coupled to the management controller via the at least one network, each of the plurality of hosts comprising a respective agent, the plurality of hosts comprising a first host which comprises a first agent, perform a method comprising acts of: (A) receiving, by the management controller, reports sent by the plurality of hosts of respective quantities of data to be transmitted over the at least one network; (B) analyzing, by the management controller, data transmissions over the at least one network during at least one prior period; (C) determining, by the management controller, based at least in part upon the reports received in the act (A) and a result of the analyzing in the act (B), a first manner in which each of the plurality of hosts is to transmit data over one or more primary channels on the at least one network, and a second manner in which each of the plurality of hosts is to transmit data over one or more secondary channels on the at least one network; and (D) sending, by the management controller to the first agent, instructions comprising an indication of the first manner in which the first host is to transmit data over the one or more primary channels on the at least one network, and the second manner in which the first host is to transmit data over the one or more secondary channels on the at least one network.

Other embodiments of the invention are directed to at least one apparatus for use in a computing system comprising at least one network and a plurality of hosts coupled to the at least one network. Each of the plurality of hosts comprises a respective agent, and the plurality of hosts comprises a first host which comprises a first agent. The at least one apparatus comprises: at least one computer-readable storage medium storing instructions; and at least one computer processor, programmed via the instructions to: receive reports sent by the plurality of hosts of respective quantities of data to be transmitted over the at least one network; analyze data transmissions over the at least one network during at least one prior period; determine, based at least in part upon the received reports and a result of the analyzing of the data transmissions, a first manner in which each of the plurality of hosts is to transmit data over one or more primary channels on the at least one network, and a second manner in which each of the plurality of hosts is to transmit data over one or more secondary channels on the at least one network; and send, to the first agent, instructions comprising an indication of the first manner in which the first host is to transmit data over the one or more primary channels on the at least one network, and the second manner in which the first host is to transmit data over the one or more secondary channels on the at least one network.

The foregoing is a non-limiting summary of certain aspects of the invention, some embodiments of which are set forth in the appended listing of claims.

BRIEF DESCRIPTION OF DRAWINGS

The accompanying drawings are not intended to be drawn to scale. In the drawings, each identical or nearly identical component illustrated in the various figures is represented by a like numeral. For purposes of clarity, not every component may be labeled in every drawing. In the drawings.

DESCRIPTION

Some embodiments of the invention are directed to techniques for managing the transfer of data over a network. In some embodiments, multiple channels may be established and used for transfers of different categories of data. The amount of network bandwidth allocated to the different channels may be dynamically adjusted over time. For example, in some embodiments, one or more primary channels may be used to transfer relatively higher-priority network traffic, one or more secondary channels may be used to transfer relatively lower-priority network traffic, and network bandwidth may be dynamically apportioned amongst the channels over time to achieve any of numerous performance objectives.

Some embodiments of the invention may be used in networks in which, from each host's perspective, some traffic carries data destined for the host (hereinafter referred to as "forward link" traffic) and some traffic carries data transmitted by the host (hereinafter referred to as "return link" traffic). When embodiments of the invention are employed in such networks, the relatively higher-priority traffic may comprise forward link traffic, return link traffic or a combination thereof. Similarly, the relatively lower-priority traffic may also comprise forward link traffic, return link traffic or a combination thereof. The invention is not limited to being used in networks in which there is any relative precedence or priority between forward link traffic and return link traffic. Further, it should be appreciated that the invention is not limited to carrying forward link and return link traffic on separate channels, or to using only two channels or groups of channels. For example, in some embodiments, one or more tertiary channels may be used to transport a third category of data.

Some embodiments of the invention provide employ one or more management controllers to centrally manage the allocation of bandwidth between channels. The management controller(s) may be implemented on a single, "central" host, or on multiple distributed hosts. Agents implemented on different remote hosts may communicate with the management controller(s) and act on information provided by the management controller(s) to structure subsequent transmissions. The management controller(s) may, for example, analyze traffic flowing over the network during a prior period, as well as the quantity and type(s) of data which hosts report is to be transferred, determine how hosts on the network should transmit the data, and send information to agents on the hosts indicating how the data should be transmitted for a given subsequent period. After transmitting data over that period, agents may report to the management controller(s) on various characteristics of those transmissions, as well as quantities of data which the corresponding hosts have yet to transfer. The management controller(s) may then analyze this information, and generate new guidance to send to the agents for subsequent transfers. As such, a feedback loop may be established to enable the manner in which data is transferred across the network to be dynamically adjusted over time to accommodate any of numerous performance objectives. In this respect, one example of a performance objective is to enable enabling hosts on the network to transmit significant quantities of data over time without disrupting other traffic flowing over the network. In this example, the management controller(s) may instruct agents to allocate enough network bandwidth to transmit the quantities of data over time, without allocating so much bandwidth as to affect "day to day" traffic on the network. Embodiments of the invention may support the achievement of any of numerous performance objectives.

Figure 1:
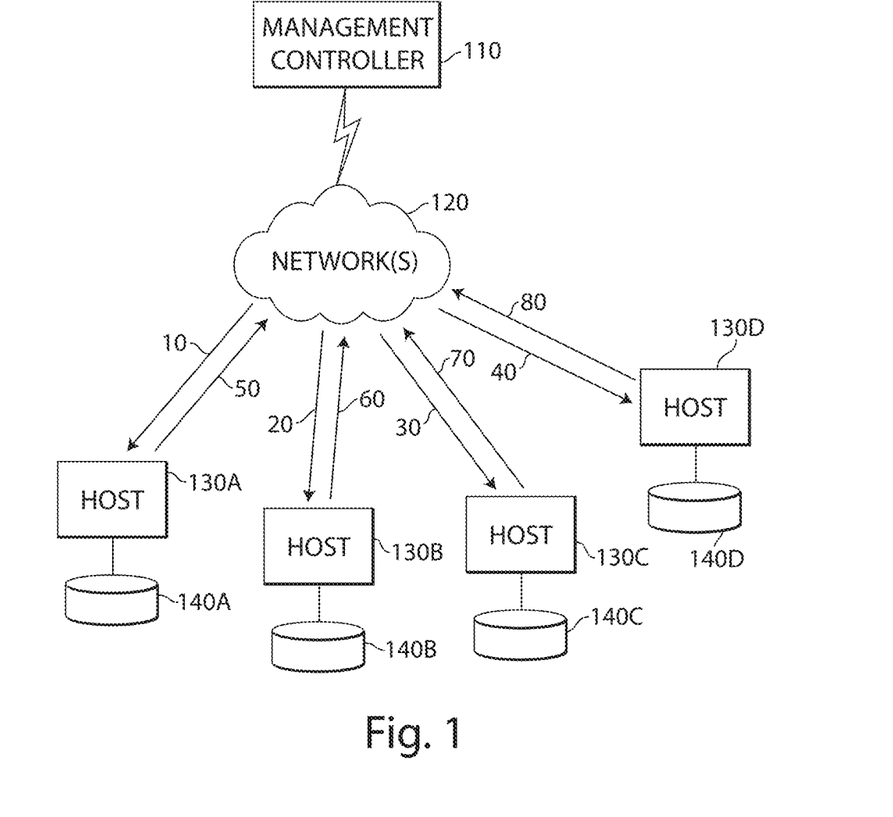
FIG. 1 is a block diagram depicting representative components of a system for managing the transfer of data over one or more networks, in accordance with some embodiments of the invention.

FIG. 1 depicts a representative system 100 for managing the transfer of data over one or more networks. In representative system 100, hosts 130A-130D communicate via network(s) 120, which may comprise any suitable communications infrastructure, and use any suitable communication protocol(s) to transport data. As one example, in some embodiments, network(s) 120 may comprise one or more satellite links for transferring data to and from hosts 130A-130D disposed on mobile vehicles (e.g., vessels at sea). In this respect, in some implementations, if all of hosts 130A-130D are located in a particular geographic area, they may share a particular satellite link (not shown in FIG. 1), and receive transmissions from, and send transmissions through, the shared link. It should be appreciated, however, that the invention is not limited to being used in systems wherein multiple hosts share a particular link, or in systems in which a satellite constitutes a link, and may be used in networks having any suitable configuration and characteristics, such as networks which have only terrestrial components, and/or in which multiple hosts do not transmit and receive transmissions through any particular link.

Hosts 130A-130D may each comprise any suitable device(s). For example, each host 130 may comprise a server computer, personal computer, mobile device (e.g., a cellular telephone, tablet device, gaming console, etc.), set-top media console, and/or any other suitable computing device. In representative system 100, each host 130 accesses a corresponding data storage facility 140. Each data storage facility 140 may comprise any suitable storage component(s) and use any suitable storage technique(s). Although only four hosts 130A-130D are shown in FIG. 1, it should be appreciated that embodiments of the invention may be employed in systems comprising any suitable number of host devices.

In certain implementations of system 100 in which hosts 130A-130D are each disposed on vessels at sea, some traffic on network(s) 120 may include (for example) charts, weather data, commands and/or other types of information that are critical to a vessel's operation, and some traffic may include data captured by various sensors on a vessel describing its health and operations (e.g., log files), being sent to onshore servers for analysis. In some systems, transmission of the data captured by sensors on a vessel may be considered relatively lower-priority network traffic, and transmission of up-to-date charts, weather data, instructions, etc. may be considered relatively higher-priority network traffic. Of course, the invention is not limited to being used in systems which ascribe any particular level of importance to transmissions of any particular type(s).

It should be appreciated that, in systems in which data collected by sensors on vessels at sea, such data is commonly comprised of large files. For example, a single vessel's log files describing its operations in a single day often constitutes between five hundred megabytes and one gigabyte of data. In systems in which the total amount of bandwidth available to transfer data is limited, transporting such large quantities of data using conventional techniques can be problematic, particularly in systems in which multiple vessels may simultaneously attempt to send large volumes of data over a single "shared" network link (e.g., a satellite link). For example, it is not uncommon for multiple vessels to attempt to send more data in aggregate than a satellite's beam can accommodate, and this can impair the satellite's ability to handle not only other return link traffic but also forward link traffic to vessels as well. Moreover, it is not uncommon for a vessel which determines that its previous attempts to send a file have failed to respond by amplifying the power of subsequent transmissions to the satellite, which can exacerbate the satellite's difficulty in handling transmissions from other vessels, especially if those other vessels respond in kind by also amplifying the power of their signals. If the satellite nears or exceeds its transfer capacity, it may instruct all vessels to cease transmitting for a certain period of time, thereby causing unnecessary delays across the network. In systems wherein substantially all of a network's capacity is needed to support the data transfer needs of its hosts, such delays can have significant adverse effects.

In representative system 100, a single management controller 110 communicates with hosts 130A-130D to manage the transfer of data via network(s) 120. Management controller 110 may, for example, implement multiple channels for accommodating different categories of data transfers, and may seek to allocate network bandwidth amongst the channels to, for example, maximize the total amount of data transported across the network, eliminate bottlenecks and delays, and/or enable hosts to efficiently transfer large amounts of data over time. For example, in some embodiments, one or more primary channels may be used to transfer higher-priority network traffic and one or more secondary channels may be used to transfer lower-priority network traffic. Network bandwidth may be dynamically allocated amongst the channels based upon performance objectives and factors such as the quantity and type(s) of traffic flowing over the network, the quantity and type(s) of data to be transferred by hosts on the network, and/or other considerations.

It should be appreciated that the term "channel" is used herein to denote a manner in which data is encoded and/or otherwise prepared for transport along a path between nodes on a network. A path may be defined at least in part by the physical network infrastructure over which a transmission travels (e.g., over a particular physical link or connection between nodes), by the manner in which a transmission is routed over a network (e.g., through a particular network (e.g., gateway) address in traveling between two nodes), by characteristics of the transmission itself (e.g., its frequency) and/or to an assigned carrier frequency (e.g., for radio frequency transmissions). In some embodiments of the invention, management controller 110 may indicate that hosts use one or more secondary channels by, for example, specifying that such transmissions are to be routed over a network in one or more particular ways, such as through one or more particular network addresses in traveling between nodes. In other embodiments, transmissions on multiple channels may be routed over one or more particular network addresses. For example, data transmitted on two different channels may flow through a single IP gateway, so that each channel limits the data rate of traffic queuing into it. (This may be analogous to two routers connecting to a single router, where each router has a given rate throughput.) In some embodiments, the channel could further encode the data in such a way that it is decoded on the receiving side of the path such that each channel data can be uniquely handled. It should be appreciated that sending information over one or more channels may be accomplished in any of numerous ways, and the invention is not limited to any particular technique(s), or to using any number of channels, or to using channels of any particular type(s).

It should also be appreciated that management controller 110 may be implemented in any of numerous ways. For example, in some embodiments, management controller 110 may be implemented via one or more processors which execute software to implement the functionality described herein. Alternatively, management controller 110 may be implemented solely via hardware (e.g., via an application-specific integrated circuit, etc.), or via some combination of hardware and software. If implemented at least in part using software, management controller 110 may execute on any suitable number of processors, which may be physically distributed amongst any suitable number of computers.

Figure 2:
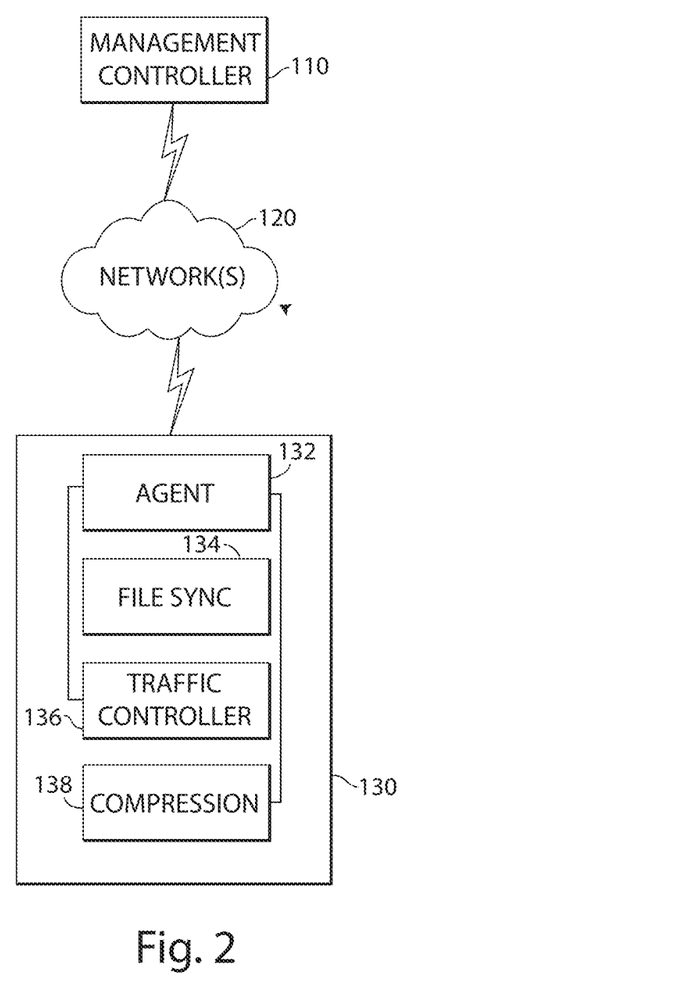
FIG. 2 is a block diagram depicting representative components of a network host, in accordance with some embodiments of the invention.

In some embodiments, management controller 110 may communicate with agents implemented on each of hosts 130A-130D to manage transmissions over network(s) 120. In this respect, FIG. 2 depicts a representative host 130, which executes program modules constituting an agent 132, file synchronization component 134, traffic controller component 136, and compression component 138. Agent 132 communicates with management controller 110, both to receive information for use in determining how the host should transmit data, and to deliver information on prior transmissions and quantities of data yet to be transferred. Traffic controller component 136 may process the information received from management controller 110 to determine how (e.g., at what rate, on what channel(s), etc.) host 130 should transfer data, and to control the transmission of data by the host over network(s) 120. Traffic controller component 136 may, for example, use the algorithms which are described below in determining how the host should transmit data. File synchronization component 134 may provide information to agent 132 on data yet to be sent by host 130, which agent 132 may then communicate to management controller 110. Compression component 138 controls compression of data prior to transmission. Any suitable compression technique(s) may be used, including those which involve file- and/or packet-level compression. Functionality provided by each of modules 132, 134, 136 and 138 is described in further detail below.

Figure 3:
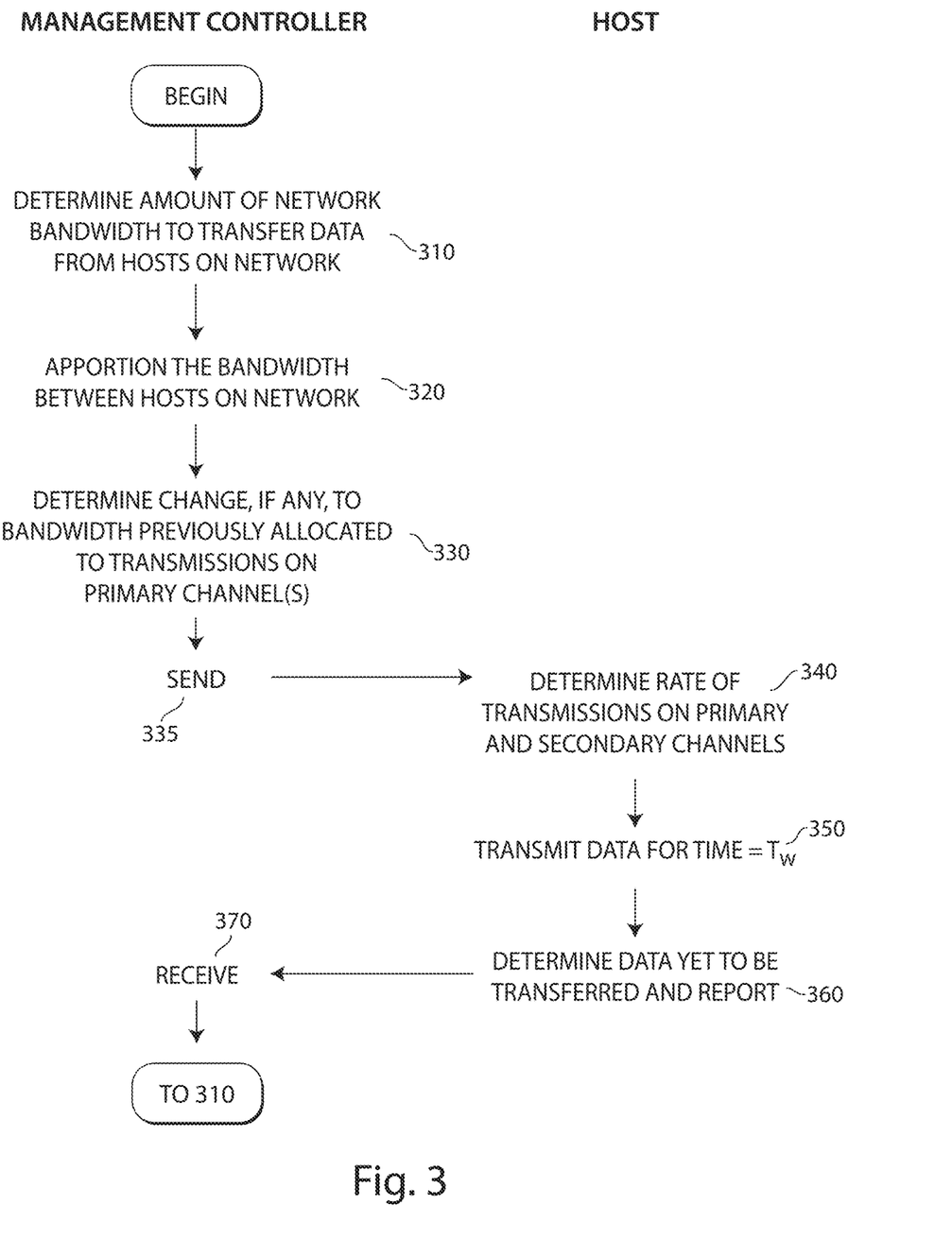
FIG. 3 is a flowchart depicting a representative technique for managing the transfer of data over one or more networks, in accordance with some embodiments of the invention.

FIG. 3 depicts a representative process 300 for managing transmissions by a particular host 130 which has data to transport on the network, and includes acts which are performed by both management controller 110 and the host 130. In general, these acts include management controller 110 analyzing data on the quantity and type(s) of traffic over the network during a prior period, and the quantity and type(s) of data yet to be transferred by various hosts on the network, to produce information for host 130 to use in performing subsequent transmissions. In the description of representative process 300 that follows, it is assumed that two channels are used to transfer data, the first of which (referred to below as the primary channel) is used to transport higher-priority traffic, and the second of which (referred to below as the secondary channel) is used to transport lower-priority traffic. It should be appreciated, however, that any suitable number of channels may be used (e.g., in some variations on representative process 300, more than two channels may be used), and that each channel may be used to carry any suitable type(s) of traffic.

At the start of representative process 300, management controller 110 computes an amount of network bandwidth, expressed as a rate of transfer, to transfer data which hosts on the network report is yet to be transferred. In this respect, of a total population of N hosts on the network (e.g., in representative system 100, hosts 130A-130D), it may be expected that a subset M (e.g., hosts 130A and 130B) may indicate to management controller 110 that they have data to be transferred over the network. Management controller 110 may, in some embodiments, compute a rate of transfer to enable this amount of data to be transported in a given period, such as one day. In some embodiments, the rate of transfer may be computed in a manner which allows for a greater amount of data to be transferred than the amount which hosts report, to provide flexibility for increases. As such, if M hosts report that ten gigabytes in total are to be transferred, or if management controller 110 determines that an amount of data that may be transferred may reach ten gigabytes, then the management controller may compute a transfer rate (i.e., BWc2, expressed in megabits per second) for transporting the data in one day as follows:

$BWc2$=10 gigabytes×8 bits/byte×1 day/86400 seconds=0.925 megabits/second

Representative process 300 then proceeds to act 320, wherein management controller 110 apportions BWc2 among the M hosts reporting a quantity of data that is yet to be transferred. This may be performed in any of numerous ways. In some embodiments, management controller 110 may apportion an equal amount of bandwidth to each of the M hosts that have indicated a quantity of data to be transferred. In other embodiments, management controller 110 may apportion bandwidth unequally, such as proportionally, so that (for example) hosts indicating relatively greater quantities of data to be transferred may be apportioned greater portions of the overall bandwidth. Any suitable technique may be used. For purposes of illustration here, assume here that bandwidth BWc2 is apportioned equally among M hosts. Management controller thus calculates the bandwidth for each host in subset M (i.e., BWc2m, expressed in megabits/second) as follows:

$BWc2m$=$BWc2$/$M$=0.925 megabits/second/2 hosts=0.463 megabits/second/host

Process 300 then proceeds to act 330, wherein management controller 110 computes an amount by which the bandwidth allocated to the primary channel for higher-priority traffic is to be changed, to accommodate the amount of lower-priority traffic to be sent on the secondary channel that was computed in the act 310. In some embodiments, this amount may be expressed as a percentage change from a previously established amount of bandwidth allocated to the primary channel.

The amount by which the bandwidth allocated to the primary channel is to be changed may be determined in any of numerous ways, and the invention is not limited to any particular technique. In some embodiments, the amount may be determined based at least in part upon a comparison between an observed maximum throughput on the network and an observed current throughput on the network. In this respect, it should be appreciated that with some networks, defining a "maximum network throughput" may be difficult to do in absolute terms, since the network's capacity and performance may be affected at times by factors which have little to do with how the individual components of the network are performing. For example, in satellite networks, large weather systems may affect a network's overall throughput, as hosts may temporarily experience difficulty communicating with network links during storms. As a result, some embodiments of the invention provide techniques for determining a network's maximum throughput based upon observations of network traffic over a prior period (e.g., 24 hours). These techniques may, for example, take into account any of numerous types of observations, which may be reported by hosts on the network and/or obtained in other ways. For example, various embodiments may use an observed mean, median, maximum, and/or minimum amount of traffic over the prior period, a quantity of simultaneous network connections, a number of errors, observed fragmentation, the throughput on a designated "reference" host, and/or other information in determining maximum network throughput over a prior period. These observations may be analyzed in any of various ways (e.g., filtered to remove outlier measurements, etc.) to determine an observed maximum network throughput over that period.

The observed current network throughput may, for example, be determined using similar techniques, but using observations from a much shorter and more recent time period (e.g., the last 12 seconds). It should be appreciated, however, that the observed current network throughput may be based upon any suitable observation(s), over any suitable time period(s), and may be calculated using any suitable technique(s), which may or may not be similar in some respects to the technique(s) used to calculate maximum network throughput.

In representative process 300, the amount by which the bandwidth allocated to the primary channel for higher-priority traffic is to change (i.e., $BWc1p$) is determined based upon the observed maximum network throughput (i.e., $BWmax$), the observed current network throughput (i.e., $BWcur$) and the amount of bandwidth needed to transfer data from hosts on the network indicating a quantity of data to be transferred (i.e., $BWc2$). That is, in some embodiments, management controller 110 calculates $BWc1p$ as follows:

$$BWc1=BWcur-(BWmax-BWc2)$$

If $BWc1<0$, then $BWc1p=0$; else $BWc1p=BWc1/BWmax$

Continuing with the above example (in which $BWc2=0.925$ megabits/second) to illustrate, assume that $BWmax$ is determined to be 10 megabits/second, and $BWcur$ is determined to be 9.5 megabits/second. This means that $BWc1=9.5$ megabits/second$-(10$ megabits/second$-0.925$ megabits/second)$=0.425$ megabits/second. Since $BWc1$ is not less than zero, $BWc1p=(0.425$ megabits/second/10 megabits/second)$=0.0425$, or 4.25%, indicating that the bandwidth allocated to the primary channel for higher-priority traffic is to be reduced by 4.25%.

Representative process 300 then proceeds to act 335, wherein management controller 110 sends $BWc1p$ (i.e., calculated in the act 330) and $BWc2m$ (i.e., calculated in the act 320) to the host. It should be appreciated that, in some embodiments, act 335 may be performed multiple times, to send this information to multiple hosts on the network.

In act 340, the host receives this information, uses $BWc2m$ as the transfer rate on the secondary channel, and determines a transfer rate for use on the primary channel. As with the act 330, this may be performed in any of numerous ways. In some embodiments, a transfer rate for use with the primary channel may be determined based in part upon the host's observed local maximum throughput over a prior period (i.e., $BWLmax$). The host's observed local maximum throughput may, for example, be determined using techniques which are similar to those described above for determining the overall network's observed maximum throughput over a prior period, or using other techniques. Any of numerous forms of statistical and/or other types of analysis may be performed on observed throughput over a prior period. Any suitable observation(s), over any suitable period(s), may be analyzed in any suitable way(s) to yield the host's observed local maximum throughput, as the invention is not limited to any particular manner of implementation.

In some embodiments, the host determines the transfer rate for use on the primary channel (i.e., $BWLc1$) as follows:

$$BWLc1=(1-BWc1p)\times BWLmax$$

To illustrate, assume that the host's maximum observed throughput over the prior period is 1 megabit/second. This means that $BWLc1=(95.25\%)\times 1$ megabit/second$=0.953$ megabits/second to use as a transfer rate on the primary channel.

Representative process 300 then proceeds to act 350, wherein the host (e.g., traffic controller 136) transmits data on the primary channel at the rate $BWLc1$ calculated in the act 340, and on the secondary channel at the rate $BWc2m$ received in the act 340, for a period of time Tw, which may be any suitable amount of time (e.g., twenty seconds).

It can be seen from the foregoing that the host 130 may transmit data at an overall rate which exceeds its $BWLmax$ (i.e., it may transmit at 0.953 megabits/second (i.e., $BWLc1$) on the primary channel and at 0.463 megabits/second (i.e., $BWc2m$) on the secondary channel, or 1.416 megabits/second overall), at least temporarily. This rate of transfer may be offset by other hosts on the network not reporting data to be transported transmitting at a lower rate than they might otherwise (i.e., without direction from the management controller). That is, the host(s) in subset M reporting data to be transported over the network may transmit at a higher rate (at least temporarily) while one or more other hosts not in subset M may reduce the rate at which they transmit (at least temporarily) so that the overall amount of data being transported at any one time does not exceed the network's capacity. As the population of hosts in subset M (i.e., reporting data to be transported over the network) may shift over time, bandwidth may apportioned differently between the hosts on the network over time as well, to accommodate the changing data transfer needs of the population of hosts on the network, and to efficiently utilize network resources in transporting data.

It should be appreciated that a host may act on the information provided by the management controller regarding rate of data transfer in any of numerous ways. For example, in some embodiments, information provided by the management controller which indicates that a host should reduce the rate at which it transmits over the primary channel by 4.25% may not be acted upon by a host immediately, but over a period of time. For example, if the host (e.g., traffic controller 136, FIG. 2) determines that maintaining, or even increasing, the transmission rate on the primary channel for a short time may result in a subsequent "quiet period" during which relatively little data is left to be transmitted, then the host may temporarily maintain or even increase its transmissions during that short time if a subsequent slowdown may cause the overall transfer rate on the primary channel over the period Tw to be within the guidelines indicated by the management controller.

It should also be appreciated that transmissions by a host may be of any suitable type. As one example, transmissions need not be point-to-point transmissions to another host, and may, for example, be destined for multiple other hosts (e.g., multicast transmissions). As another example, transmissions may use any suitable communication protocol(s). As one example, in packetized networks which employ the Internet Protocol, transmissions may employ User Datagram Protocol rather than Transport Control Protocol, to take advantage of the relative lack of overhead imposed by connectionless communications. As yet another example, transmissions may employ error correction techniques, so that data may be recovered if transmissions are interrupted or other circumstances prevent a destination host from receiving a transmission.

It should further be appreciated that transmissions by the host may be compressed (e.g., by compression component 138, FIG. 2) prior to transmission. In this respect, the Assignee has appreciated that because many compression techniques function better (i.e., yield data which is more compressed) when larger amounts of data are processed, regulating the rates at which a host transmits can cause a backlog of transmissions to build up, and this backlog may provide opportunities to more effectively compress the data in those transmissions. Using an example to illustrate, if a host were allowed to transmit data more freely (e.g., if the techniques described above were not used), then the host may seek to compress, say, a megabyte of data prior to transmitting it over the network. Employing compression algorithms on such a small volume of data may relatively small gains, and so the megabyte of data may be compressed to, say, ten kilobytes or so. By contrast, when transmissions by the host are regulated (e.g., using the techniques described above), then the backlog of transmissions that may build up can mean that, say, twenty megabytes of data may be waiting to be transmitted at a given time, such that more effective compression may be performed on that data. Of course, more effective compression by each host on the network can mean that significantly less data is transported over the network overall, even further improving the network's performance in moving information between nodes.

At the completion of act 350 (i.e., in the example shown in FIG. 3, after Tw has elapsed), process 300 proceeds to act 360, wherein the host determines a quantity of data that is yet to be transferred. This determination may be made in any suitable way. For example, file synchronization component 134 may determine a quantity of data yet to be transferred, and report this quantity to agent 132. This information, and the BWLmax calculated in the act 340, are then reported to management controller 110.

Management controller 110 receives this information in act 370, and the process then returns to act 310, so as to be repeated in the manner described above. Thus, a continuous loop is provided in which transmissions on primary and secondary channels may be dynamically adjusted over time to accommodate any desired network performance objective(s). For example, hosts on the network may be allowed to transfer significant amounts of data over time, without significant disruption to other network traffic. This ability may be especially useful in implementations wherein hosts are to move large quantities of data, but need not do so quickly, such as in systems wherein hosts reside on mobile vehicles such as vessels at sea, and the data to be moved comprises log files containing data collected by sensors relating to the vessel's operations.

It should be appreciated that numerous variations on representative process 300 are possible. For example, in some variations, not all of the acts described above with reference to FIG. 3 may be performed, and in some variations, other acts which are not described above may be performed. As another example, in some variations, one or more of the acts described above may be performed in a different sequence than that which is described.

In another example variation on representative process 300, traffic need not be apportioned across only two channels, as any suitable number of channels may be employed. For example, some variations on representative process 300 may use more than two channels, and implement a tiered approach to diverting traffic away from the primary channel. For example, in some embodiments, if one or more criteria are determined to be satisfied (e.g., if a certain quantity of hosts indicate data yet to be transferred, if a certain quantity of data is yet to be transferred, and/or any other suitable criteria), then a third channel may be used to carry traffic, and traffic may be apportioned across the first, second and third channels so as not to exceed a certain amount of traffic on the first and/or second channels. Any suitable number of channels may be used, in any of numerous ways.

In another example variation, the continuous loop which process 300 represents may be interrupted (e.g., periodically at set intervals, in response to certain criteria being met. and/or based on any of numerous other criteria being met) so that the traffic flowing across the network may be observed in the absence of multiple channels. This may serve any of numerous purposes, such as analyzing how a channelized approach affects traffic flow, how BWmax and/or BWcur vary in the absence of multiple channels, etc.

In yet another example variation, representative process 300 may be modified to introduce error handling procedures by each host. For example, if a host does not receive any information from the management controller for a certain period of time indicating how traffic is to be directed to each of multiple channels, then the host may discontinue using multiple channels to send data and revert to a non-channelized approach. In this respect, an absence of direction on how to apportion data between multiple channels may indicate that reverting to a non-channelized approach is wisest.

Figure 4:
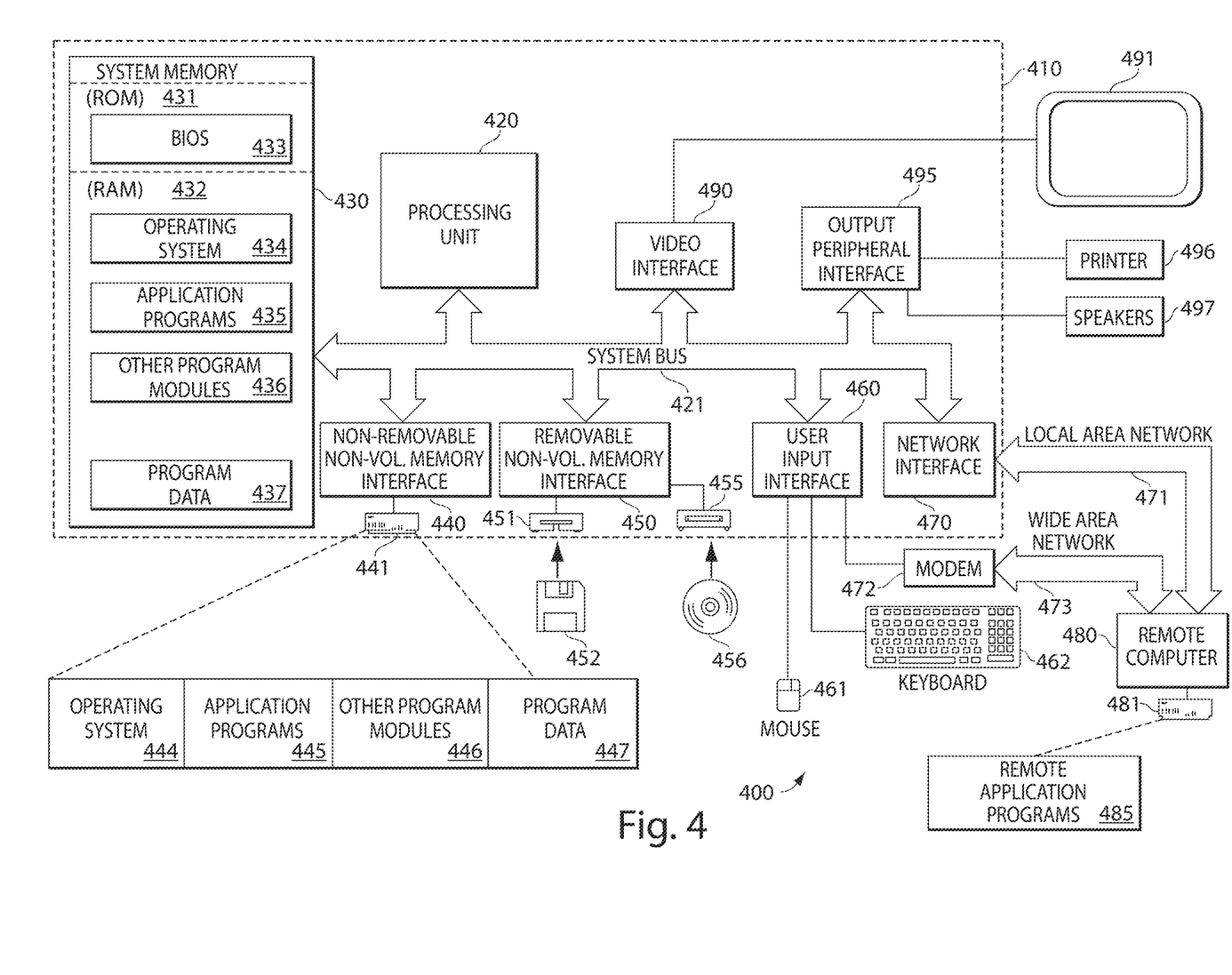
FIG. 4 is a block diagram of a representative computer system which may be used to implement aspects of the invention.

It should be appreciated from the foregoing that some aspects of the invention may be implemented using a computing system. For example, as noted above, management controller 110, any or all of the links comprising network(s) 120, hosts 130A-130D, and/or storage facilities 140A-140D may be implemented, in whole or in part, via a computing system. FIG. 4 illustrates one example of a computing system 400 which may be suitable for implementing various aspects of the invention. The computing system shown in FIG. 4 is only one example of a suitable computing system, and is not intended to suggest any limitation as to the scope of use or functionality of the invention. Additionally, the suitability of computing system 400 should not be interpreted as having any dependency or requirement relating to any one or more of the components shown in FIG. 4. In this respect, the invention is operational with numerous other general purpose or special purpose computing system environments or configurations. Examples of well-known computing systems, environments, and/or configurations that may be suitable for use with the invention include, but are not limited to, personal computers, server computers, mobile or laptop devices, multiprocessor systems, microprocessor-based systems, set-top boxes, programmable consumer electronics, network PCs, minicomputers, mainframe computers, distributed computing environments that include any of the above systems or devices, and the like.

Computing system 400 may execute computer-executable instructions, such as program modules. Generally, program modules include routines, programs, objects, components, data structures, etc. that perform particular tasks or implement particular abstract data types. The invention may also be practiced in distributed computing environments where tasks are performed by multiple processing devices that are linked through a communications network. In a distributed computing system, program modules may be located in both local and remote computer storage media including memory storage devices.

FIG. 4 depicts a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media which may be used to store the desired information and may be accessed by computer 410. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating system include, but are not limited to, magnetic tape cassettes, flash memory cards, digital versatile disks, digital video tape, solid state RAM, solid state ROM, and the like. The hard disk drive 441 is typically connected to the system bus 421 through an non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 536, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 560 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through a output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, the invention may be embodied as a computer readable medium other than a computer-readable storage medium, such as a transitory medium like a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention may be embodied as a method, of which an example has been provided. The acts performed as part of the method may be ordered in any suitable way. Accordingly, embodiments may be constructed in which acts are performed in an order different than illustrated, which may include different acts than those which are described, and/or which may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for use in a computing system comprising at least one network, a plurality of hosts coupled to the at least one network, and at least one management controller coupled to the plurality of hosts via the at least one network, the method comprising acts of:
   (A) receiving, by the at least one management controller, from each one of the plurality of hosts, an indication of a quantity of data of a first type and a quantity of data of a second type to be transmitted by the one host over the at least one network; and
   (B) determining, based at least in part on the indications received in the act (A), a rate at which each of the plurality of hosts is to transmit data of the first type over at least one first channel on the at least one network, and a rate at which each of the plurality of hosts is to transmit data of the second type over at least one second channel on the at least one network.

2. The method of claim 1, wherein the determining in the act (B) is based at least in part on data transmissions over the at least one network during at least on prior period.

3. The method of claim 1, comprising an act of:
   (C) determining a rate at which each of the plurality of hosts is to transmit data of the first type over the at least one second channel, and a rate at which each of the plurality of hosts is to transmit data of the second type over the at least one first channel.

4. The method of claim 3, wherein the act (C) is performed at the same time as the act (B).

5. The method of claim 1, wherein at least some of the plurality of hosts reside on vessels at sea.

6. The method of claim 5, wherein the data of the first type comprises at least one of charts, weather data, and commands relating to operation of the vessels at sea, and wherein the act (B) comprises determining a rate at which each of the plurality of hosts is to transmit on the at least one first channel which is greater than a rate at which each of the plurality of hosts is to transmit on the at least one second channel.

7. The method of claim 5, wherein the data of the second type relates to operations by equipment on the vessels at sea, and wherein the act (B) comprises determining a rate at which at least one of the plurality of hosts is to transmit on the at least one second channel which is lower than a rate at which at least one of the plurality of hosts is to transmit on the at least one first channel.

8. The method of claim 1, wherein the data of the first type constitutes forward link traffic, and wherein the act (B) comprises determining a rate at which at least one of the plurality of hosts is to transmit on the at least one first channel which is greater than a rate at which the at least one host is to transmit on the at least one second channel.

9. The method of claim 1, wherein the data of the second type constitutes return link traffic, and wherein the act (B) comprises determining a rate at which at least one of the plurality of hosts is to transmit on the at least one second channel which is lower than a rate at which the at least one host is to transmit on the at least one first channel.

10. The method of claim 1, wherein the at least one network comprises at least one satellite link.

11. The method of claim 1, wherein the act (B) comprises determining a rate at which each of the plurality of hosts is to transmit data over at least one third channel on the at least one network.

12. The method of claim 11, wherein the act of determining the rate at which each of the plurality of hosts is to transmit data over the at least one third channel is performed in response to the management controller determining at least one of (1) the plurality of hosts exceeding a predetermined quantity of hosts, and (2) a quantity of data to be transmitted by the plurality of hosts exceeding a predetermined quantity of data.

13. The method of claim 1, wherein the act (B) comprises determining a rate at which a particular host of the plurality of hosts is to transmit data of the first type based at least in part upon an amount of time over which data of the first type is to be transmitted by the particular host.

14. The method of claim 1, wherein data of the first type consists of one or more files.

15. The method of claim 14, wherein data of the second type consists of one or more files.

16. The method of claim 1, comprising an act, performed by a particular host of the plurality of hosts, of transmitting data of the first type at the rate determined in the act (B) automatically in response to receiving information from the at least one management controller.

17. The method of claim 1, wherein the act (B) comprises determining a rate at which a particular host of the plurality of hosts is to transmit data of the first type based at least in part upon a backlog of transmissions at the particular host.

18. The method of claim 17, wherein the act (B) comprises determining a rate at which the particular host is to transmit data of the first type over the at least one second channel.

19. The method of claim 1, wherein the at least one network comprises at least one satellite link and at least one terrestrial component.

20. The method of claim 1, wherein the at least one network consists of terrestrial components.

21. The method of claim 1, wherein the act (B) comprises determining a rate at which one or more of the plurality of hosts is to transmit data of the first type based at least in part upon conditions affecting the one or more hosts.

22. The method of claim 21, wherein the conditions affecting the one or more hosts comprise weather conditions.

23. The method of claim 1, wherein the act (B) comprises determining a rate at which a particular host of the plurality of hosts is to transmit data of the first type based at least in part upon an observed throughput of the particular host.

24. The method of claim 1, wherein the data of the first type comprises information relating to operational health on one or more of the plurality of hosts.

25. The method of claim 24, wherein the data relating to operational health comprises log data.

26. At least one computer-readable storage medium having instructions recorded thereon which, when executed in a computing system comprising at least one network, a plurality of hosts coupled to the at least one network, and at least one management controller coupled to the plurality of hosts via the at least one network, cause the computing system to perform a method, the method comprising acts of:
(A) receiving, from each one of the plurality of hosts, an indication of a quantity of data of a first type and a quantity of data of a second type to be transmitted by the one host over the at least one network; and
(B) determining, based at least in part on the indications received in the act (A), a rate at which each of the plurality of hosts is to transmit data of the first type over at least one first channel on the at least one network, and a rate at which each of the plurality of hosts is to transmit data of the second type over at least one second channel on the at least one network.

27. An apparatus, comprising:
at least one computer-readable storage medium having instructions recorded thereon; and
at least one computer processor, programmed via the instructions to:
receive, from each one of the plurality of hosts, via at least one network, an indication of a quantity of data of a first type and a quantity of data of a second type to be transmitted by the one host over the at least one network; and
determine, based at least in part on the received indications, a rate at which each of the plurality of hosts is to transmit data of the first type over at least one first channel on the at least one network, and a rate at which each of the plurality of hosts is to transmit data of the second type over at least one second channel on the at least one network.

28. The apparatus of claim 27, wherein the at least one computer processor is programmed to determine the rate at which each of the plurality of hosts is to transmit data of the first type and of the second type based at least in part on data transmissions over the at least one network during at least on prior period.

29. The apparatus of claim 27, wherein the at least one computer processor is programmed to determine a rate at which each of the plurality of hosts is to transmit data of the first type over the at least one second channel, and a rate at which each of the plurality of hosts is to transmit data of the second type over the at least one first channel.

30. The apparatus of claim 29, wherein the at least one computer processor is programmed to determine the rate at which each of the plurality of hosts is to transmit data of the first type over the at least one second channel and the rate at which each of the plurality of hosts is to transmit data of the second type over the at least one first channel at the same time as determining the rate at which each of the plurality of hosts is to transmit data of the first type over the at least one first channel and the rate at which each of the plurality of hosts is to transmit data of the second type over the at least one second channel.

31. The apparatus of claim 27, wherein the at least one computer processor is programmed to receive the indications from a plurality of hosts each residing on a vessel at sea.

32. The apparatus of claim 31, wherein the data of the first type comprises at least one of charts, weather data, and commands relating to operation of the vessels at sea, and wherein the at least one computer processor is programmed to determine a rate at which each of the plurality of hosts is to transmit on the at least one first channel which is greater than a rate at which each of the plurality of hosts is to transmit on the at least one second channel.

33. The apparatus of claim 31, wherein the data of the second type relates to operations by equipment on the vessels at sea, and wherein the at least one computer processor is programmed to determine a rate at which at least one of the plurality of hosts is to transmit on the at least one second channel which is lower than a rate at which at least one of the plurality of hosts is to transmit on the at least one first channel.

34. The apparatus of claim 27, wherein the data of the first type constitutes forward link traffic, and wherein the at least one computer processor is programmed to determine a rate at which at least one of the plurality of hosts is to transmit on the at least one first channel which is greater than a rate at which the at least one host is to transmit on the at least one second channel.

35. The apparatus of claim 27, wherein the data of the second type constitutes return link traffic, and wherein the at least one computer processor is programmed to determine a rate at which at least one of the plurality of hosts is to transmit on the at least one second channel which is lower than a rate at which the at least one host is to transmit on the at least one first channel.

36. The apparatus of claim 27, wherein the at least one computer processor is programmed to receive the indications via at least one network comprising at least one satellite link.

37. The apparatus of claim 27, wherein the at least one computer processor is programmed to determine a rate at which each of the plurality of hosts is to transmit data over at least one third channel on the at least one network.

38. The apparatus of claim 37, wherein the at least one computer processor is programmed to determine the rate at which each of the plurality of hosts is to transmit data over the at least one third channel in response to determining at least one of (1) the plurality of hosts exceeding a predetermined quantity of hosts, and (2) a quantity of data to be transmitted by the plurality of hosts exceeding a predetermined quantity of data.

39. The apparatus of claim 27, wherein the at least one computer processor is programmed to determine a rate at which a particular host of the plurality of hosts is to transmit data of the first type based at least in part upon an amount of time over which data of the first type is to be transmitted by the particular host.

40. The apparatus of claim 27, wherein data of the first type consists of one or more files.

41. The apparatus of claim 40, wherein data of the second type consists of one or more files.

42. The apparatus of claim 27, wherein the at least one computer processor is programmed to determine a rate at which a particular host of the plurality of hosts is to transmit data of the first type based at least in part upon a backlog of transmissions at the particular host.

43. The apparatus of claim 42, wherein the at least one computer processor is programmed to determine a rate at which the particular host is to transmit data of the first type over the at least one second channel.

44. The apparatus of claim 27, wherein the at least one computer processor is programmed to receive the indications via at least one network comprising at least one satellite link and at least one terrestrial component.

45. The apparatus of claim 27, wherein the at least one computer processor is programmed to receive the indications via at least one network consisting of terrestrial components.

46. The apparatus of claim 27, wherein the at least one computer processor is programmed to determine a rate at which one or more of the plurality of hosts is to transmit data of the first type based at least in part upon conditions affecting the one or more hosts.

47. The apparatus of claim 46, wherein the conditions affecting the one or more hosts comprise weather conditions.

48. The apparatus of claim 27, wherein the at least one computer processor is programmed to determine a rate at which a particular host of the plurality of hosts is to transmit data of the first type based at least in part upon an observed throughput of the particular host.

49. The apparatus of claim 27, wherein the data of the first type comprises information relating to operational health on one or more of the plurality of hosts.

50. The apparatus of claim 49, wherein the data relating to operational health comprises log data.

* * * * *